United States Patent
Chung et al.

(10) Patent No.: US 7,158,024 B2
(45) Date of Patent: Jan. 2, 2007

(54) PACKET INTRUSION DETECTION RULE SIMPLIFICATION APPARATUS AND METHOD, AND PACKET INTRUSION DETECTION APPARATUS AND METHOD USING SIMPLIFIED INTRUSION DETECTION RULE

(75) Inventors: Bo Heung Chung, Daejeon (KR); Seungho Ryu, Seoul (KR); Jeong Nyeo Kim, Daejeon (KR); Jong Soo Jang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 231 days.

(21) Appl. No.: 11/004,322

(22) Filed: Dec. 3, 2004

(65) Prior Publication Data

US 2006/0017557 A1    Jan. 26, 2006

(30) Foreign Application Priority Data

Jul. 20, 2004    (KR) ...................... 10-2004-0056415

(51) Int. Cl.
*G08B 29/00* (2006.01)

(52) U.S. Cl. ...................... 340/515; 340/506; 340/507; 340/517; 340/521; 340/522; 340/523

(58) Field of Classification Search ................ 340/506, 340/507, 515, 517, 521, 522, 523
See application file for complete search history.

(56) References Cited

U.S. PATENT DOCUMENTS

| | | | |
|---|---|---|---|
| 6,405,318 B1 * | 6/2002 | Rowland ..................... 726/22 |
| 6,782,377 B1 * | 8/2004 | Agarwal et al. ............... 706/47 |
| 6,957,348 B1 * | 10/2005 | Flowers et al. ............... 726/23 |
| 6,983,380 B1 * | 1/2006 | Ko ................... 726/1 |
| 7,036,148 B1 * | 4/2006 | Brook et al. ................... 726/25 |
| 7,065,657 B1 * | 6/2006 | Moran ........................... 726/5 |
| 7,093,290 B1 * | 8/2006 | Han et al. ..................... 726/22 |
| 2003/0226038 A1 | 12/2003 | Raanan et al. |

FOREIGN PATENT DOCUMENTS

| | | |
|---|---|---|
| JP | 2003-085139 | 3/2003 |
| KR | 1020020091340 A | 12/2002 |
| KR | 1020030010263 A | 2/2003 |

\* cited by examiner

*Primary Examiner*—Daryl C Pope
(74) *Attorney, Agent, or Firm*—Blakely Sokoloff Taylor & Zafman

(57) ABSTRACT

A packet intrusion detection rule simplification apparatus and method and an intrusion detection apparatus and method are provided. Test conditions of at least one intrusion detection rules are rearranged based on test items, and the same test conditions for the same test items are grouped. Group rules having a connection structure of the test conditions are generated so that the test items and orders of the intrusion detection rules are satisfied. A common rule consisting of test conditions existing at the test start positions in the connection structure of the group rules is generated. Next, packet intrusion detection is performed by using the common rule, and the packet intrusion detection is performed by using the group rules. According, it is possible to reduce a load involved in the intrusion detection process by using the grouped and simplified intrusion detection rules.

12 Claims, 6 Drawing Sheets

GROUPING

PACKET INTRUSION DETECTION RULE SIMPLIFICATION APPARATUS AND METHOD, AND PACKET INTRUSION DETECTION APPARATUS AND METHOD USING SIMPLIFIED INTRUSION DETECTION RULE

BACKGROUND OF THE INVENTION

This application claims the priority of Korean Patent Application No. 2004-56415, filed on Jul. 20, 2004, in the Korean Intellectual Property Office, the disclosure of which is incorporated herein in its entirety by reference.

1. Field of the Invention

The present invention relates to a packet intrusion detection method and apparatus, and more particularly, to an intrusion detection rule simplification method and apparatus capable of reducing a load involved in an intrusion detection process and performing high-speed intrusion detection and a packet intrusion detection method and apparatus using the simplified intrusion detection rules.

2. Description of Related Art

An intrusion detection technique is classified into network-based and host (computer)-based techniques. In the network-based technique, the intrusion detection is performed by using network packets. On the other hand, in the host-based technique, the intrusion detection is performed by using log data of the associated system. These techniques have been used as an application program technique rather that a kernel-based technique in the system.

A conventional real-time kernel-based intrusion detection technique performs the packet intrusion detection by correcting the kernel based on the aforementioned two techniques and compensates for the kernel-based intrusion detection by using an additional demon program, that is, a monitoring program. However, there are limitations to the conventional kernel-based intrusion detection technique as follows.

1) An effective intrusion detection rule generation method within the kernel is not provided. A large number of intrusion detection rules need to be managed in the kernel memory and the packet intrusion detection need to be performed by using these intrusion detection rules. Therefore, there is a need for an effective intrusion detection rule generation method capable of minimizing a load involved in the inner-kernel intrusion detection process and performing high-speed packet intrusion detection.

2) An intrusion detection method suitable for operations within the kernel is not provided. In general, the inner-kernel intrusion detection process requires a high-cost test process, so that a relatively heavy load may be imposed on the kernel. Therefore, there is a need for an inner-kernel intrusion detection process capable of performing the packet intrusion detection with a minimized test cost and an inexpensive detection cost.

3) An intrusion detection mode adaptable to network situations is not provided. In network nodes such as routers and switches, there is a need to perform simplified intrusion detection or entire intrusion detection using the entire intrusion detection rules in accordance with the network situations or administrator's requests. Therefore, there is a need to modify or control the inner-kernel intrusion detection process at the user's application program level if necessary.

SUMMARY OF INVENTION

The present invention provides an apparatus and method of grouping and simplifying intrusion detection rules to reduce a system load involved in an intrusion detection process.

The present invention also provides an apparatus and method of performing packet intrusion detection by using grouped and simplified intrusion detection rules.

The present invention also provides a computer-readable medium having embodied thereon a computer program comprising a method of grouping and simplifying intrusion detection rules to reduce a system load involved in an intrusion detection process.

The present invention also provides a computer-readable medium having embodied thereon a computer program comprising a method of performing packet intrusion detection by using grouped and simplified intrusion detection rules.

According to an aspect of the present invention, there is provided an intrusion detection rule simplification apparatus comprising: a rule definition unit defining predetermined fields out of fields of a packet as test items and including at least one intrusion detection rule for defining test orders and conditions of the defined test items; a group rule generation unit rearranging the test conditions of the intrusion detection rules based on the test items, grouping the same test conditions for the same test items, and generating a connection structure of the test conditions so that the test items and orders of the intrusion detection rules are satisfied; and a common rule generation unit generating a common rule consisting of test conditions having first test orders in the generated connection structure.

According to another aspect of the present invention, there is provided an intrusion detection rule simplification method comprising: defining at least one intrusion detection rule by selecting predetermined fields out of fields of a packet as test items and defining test orders and conditions for the selected test items; rearranging the test conditions of the intrusion detection rules based on the test items, grouping the same test conditions for the same test items, and generating a connection structure of the test conditions so that the test items and orders of the intrusion detection rules are satisfied; and generating a common rule consisting of test conditions having first test orders in the generated connection structure.

According to still another aspect of the present invention, there is provided a packet intrusion detection apparatus comprising: an intrusion detection rule generation unit rearranging test conditions of at least one intrusion detection rules based on test items, grouping the same test conditions for the same test items, generating group rules having a connection structure of the test conditions so that the test items and orders of the intrusion detection rules are satisfied, and generating a common rule consisting of test conditions existing at the test start positions in the connection structure of the group rules; a common detection unit performing packet intrusion detection by using the common rule; and a group detection unit performing the packet intrusion detection by using the group rules.

According to further still another aspect of the present invention, there is provided a packet intrusion detection method comprising: rearranging test conditions of at least one intrusion detection rules based on test items, grouping the same test conditions for the same test items, generating group rules having a connection structure of the test conditions so that the test items and orders of the intrusion detection rules are satisfied, and generating a common rule consisting of test conditions existing at the test start positions in the connection structure of the group rules; performing packet intrusion detection by using the common rule; and performing the packet intrusion detection by using the group rules.

Accordingly, it is possible to reduce a load involved in an intrusion detection process by using grouped and simplified intrusion detection rules.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, an intrusion detection simplification apparatus and method and a packet intrusion detection apparatus and method using a simplified intrusion detection rule will be described in detail with reference to the accompanying drawings.

Figure 1:
FIG. 1 is a view showing a construction of a packet intrusion detection simplification apparatus according to an embodiment of the present invention.

FIG. 1 is a view showing a construction of an intrusion detection simplification apparatus according to an embodiment of the present invention.

The intrusion detection simplification apparatus includes a rule definition unit 100, a group rule generation unit 110, and a common rule generation unit 120. The apparatus of the present invention is operable within a kernel of a system.

The rule definition unit 100 defines predetermined fields out of fields of a packet as test items for intrusion detection and includes at least one intrusion detection rule for defining test orders and conditions of the defined test items.

The fields of the packet for intrusion detection include sequence number, acknowledgement number, identification (ID), data size, and flag fields. In addition to these fields, other fields may be used for test items depending on characteristics of the packet.

An intrusion detection process is a process for checking values of the associated fields of the packet in accordance with the test items, orders, and conditions of the intrusion detection rules. If a packet satisfies all the test conditions of one of the intrusion detection rules defined by the rule definition unit 100, the packet is treated as an intrusion packet.

For example, the rule definition unit 100 includes a first intrusion detection rule used to check intrusion by sequentially determining whether values of the acknowledgement number, flag, and data size fields of the packet are 121, S, and 1024, respectively, and a second intrusion detection rule used to perform packet intrusion detection based on only the value of flag field of the packet. If the values of the associated fields in the received packet satisfy all the test conditions of the first or second intrusion detection rules, the packet is treated as an intrusion packet.

The group rule generation unit 110 arranges the test items in accordance with priorities thereof and rearranges the test conditions of the intrusion detection rules defined by the rule definition unit 100 based on the test items. In addition, the group rule generation unit 110 groups test conditions common to the test items. After the common test conditions are grouped, the group rule generation unit 110 generates a connection structure of test conditions so that the test items and orders of the intrusion detection rules can be satisfied.

An intrusion detection apparatus performs the packet intrusion detection by comparing test conditions existing on predetermined paths out of the plural paths of the generated connection structure with the values of the associated fields of the packet. The group rule generation unit 110 can generate various connection structures including a tree structure. A method of generating the group rule will be described in detail with reference to FIG. 2.

The common rule generation unit 120 generates a common rule consisting of test conditions having the first test orders in the connection structure generated by the group rule generation unit 110. A method of generating the common rule will be described in detail with reference to FIG. 3.

Figure 2:
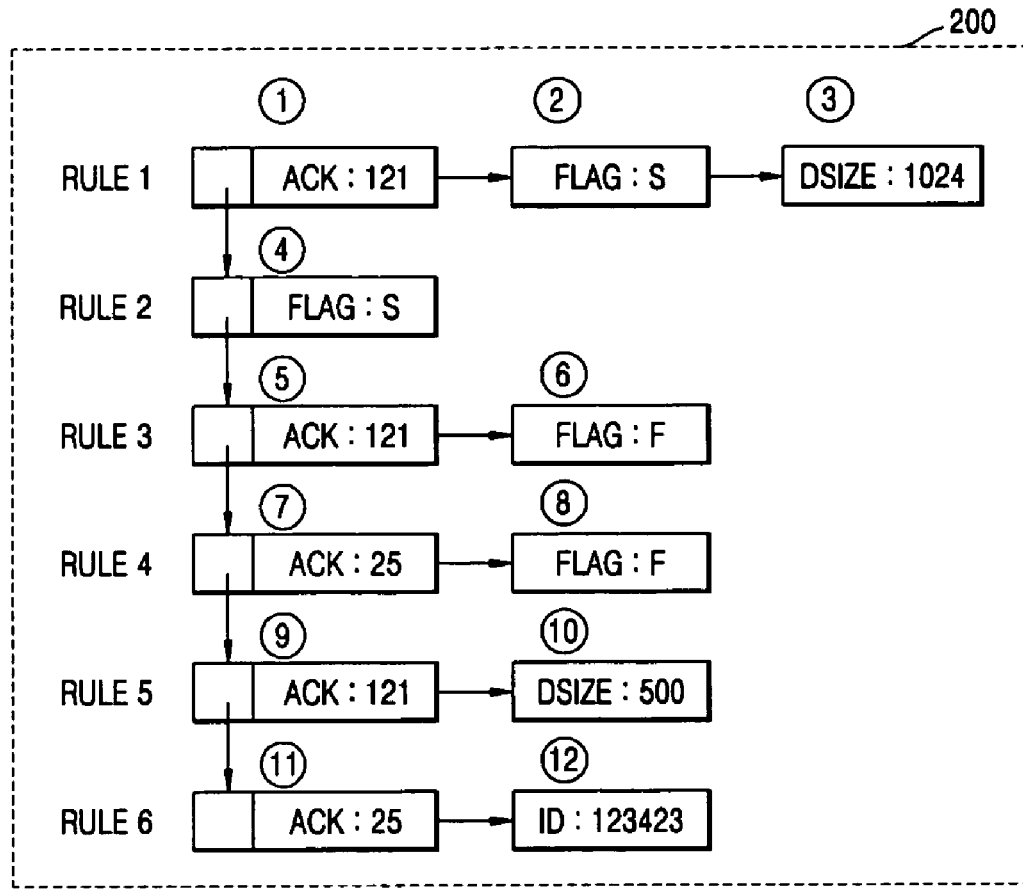
FIG. 2 is a view showing an embodiment of a method of generating group rules.
Figure 2:
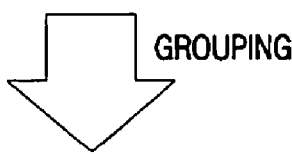
Figure 2:
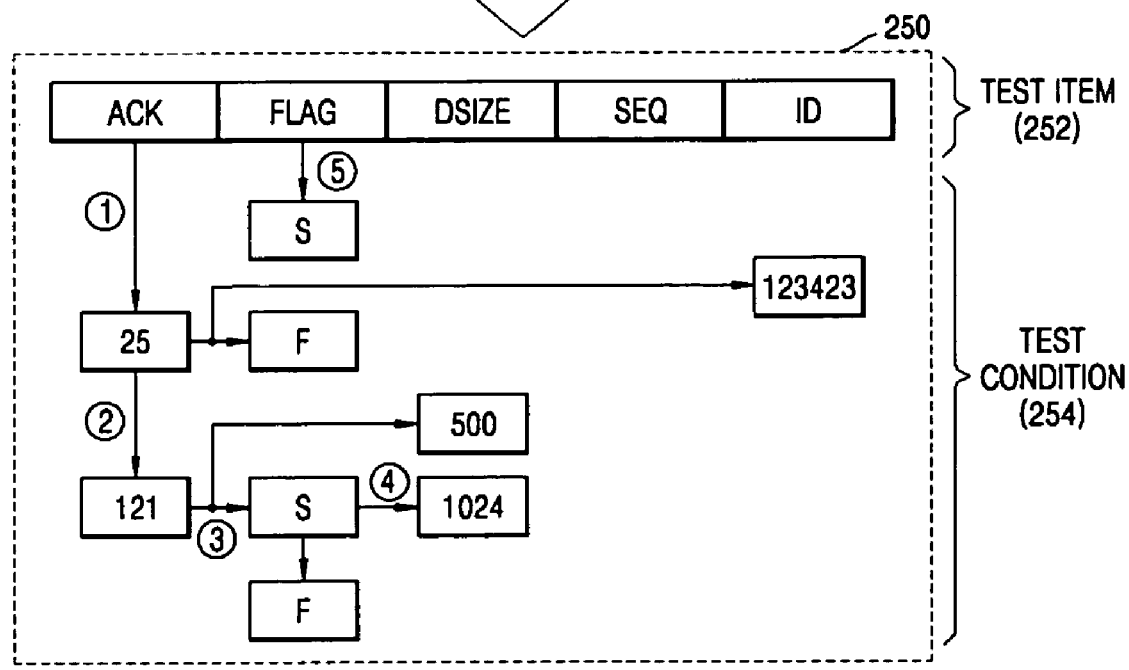

FIG. 2 is a view showing an embodiment of the group rule generation unit 110 of FIG. 1.

The group rule generation unit 110 generates the connection structure of the test conditions 254 by rearranging the test conditions of the intrusion detection rules 200 (RULE 1 to RULE 6) based on the test items 252. There are shown 6 intrusion detection rules 200 (hereinafter, referred to a rule) in FIG. 2. Reviewing some rules, the rule RULE 1 includes acknowledgement number, flag, and data size fields as test items. In addition, the rule RULE 1 includes test conditions used to determine whether values of the acknowledgement number, flag, and data size fields are 121, S, and 1012. The rule RULE 2 includes test conditions used to determine whether the value of flag field is S. The rule RULE 3 includes acknowledgement number and flag fields as test items. In addition, the rule RULE 3 includes test conditions for the test items.

The group rule generation unit 110 arranges the test items used for intrusion detection in accordance with priorities thereof. The priorities of the test items may be arbitrarily set by a system administrator. For example, a usage frequency of the test items used by the intrusion detection rules may be used as priorities of the test items.

Now, a method of generating the connection structure of the test conditions will be described in detail. The group rule generation unit 110 arranges the test conditions of the rule RULE 1 based on the test items 252. And then, the group rule generation unit 110 connects the test conditions to form a tree structure by treating the test conditions having the first test orders of the rule RULE 1 as a parent node and the test conditions having the second and next test orders as child nodes. In addition, the group rule generation unit 110 arranges the test conditions of the rule RULE 2 based on the test items 252. And then, group rule generation unit 110 connects the test conditions by treating the test conditions having the first test orders of the rule RULE 2 as a parent node. If the same test conditions exist in the generated tree structure, the test conditions are not treated as a new patent node but the existing parent node is commonly used. Next, the test conditions having the second and next test orders of the rule RULE 2 are treated as child nodes to be connected to the associated parent node in the tree structure. In a case where the existing parent node is commonly used and there exists a first child node connected to the parent node, the first child node is commonly used. Similarly, the rules RULE 3 to RULE 6 are incorporated into the tree structure.

The group rule generation unit 110 may generate the tree structure by using the rules 200 (RULE 1 to RULE 6) in an arbitrary order. The tree structure 250 generated by the group rule generation unit 110 is a group rule, which is used as a simplified intrusion detection rule.

For example, the group rule generation unit 110 arranges the test conditions (test condition of the acknowledgement number fields: 125 and test condition of the ID field: 123423) of the rule RULE 6 for the acknowledgement number and ID fields, respectively. And then, the group rule generation unit 110 generates a tree structure by treating the test conditions of the acknowledgement number and ID fields as parent and child nodes, respectively. In addition, the group rule generation unit 110 arranges the test conditions (test condition of the acknowledgement number field: 121 and test condition of the data size field: 500) of the rule RULE 5 for the acknowledgement number and data size fields, respectively, to determine whether or not the same test conditions exist in the generated tree structure. Since there is not the same test conditions of the acknowledgement number field of the rule RULE 5, the test conditions are treated as new parent and child nodes to generate the tree structure. Next, the test conditions of the acknowledgement number fields of the rules RULE 5 and RULE 8 are connected to a neighbor pointer.

Next, the group rule generation unit 110 arranges the test conditions (test condition of the acknowledgement number fields: 25 and test condition of the flag field: F) of the rule RULE 4 for the acknowledgement number and flag fields, respectively. And then, the group rule generation unit 110 generates a tree structure by treating the test conditions of the acknowledgement number and flag fields as parent and child nodes, respectively. Since there are the same test conditions as those of the acknowledgement number field of the rule RULE 4, a new parent node is not formed and the existing test condition is used as a parent node. The child nodes of the rule RULE 4 are connected to the parent node. Like this, all the rules are incorporated into the tree structure.

Conventionally, since packet intrusion detection is performed on every rule, 12 times of tests are performed in the worst case. However, according to the present invention, since the tree structure of group rules is used, 5 times of tests are performed in the worst case.

Figure 3:
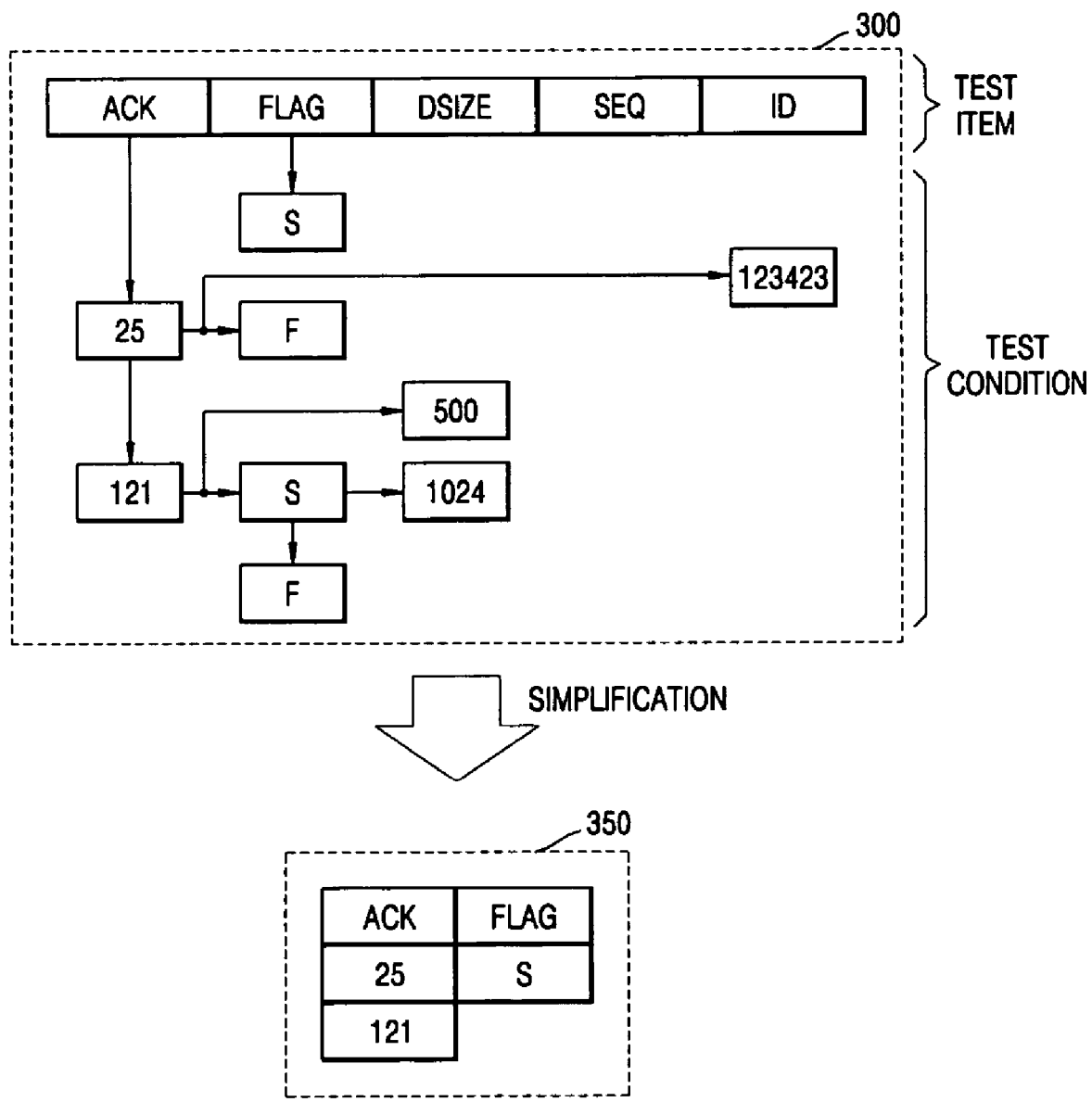
FIG. 3 is a view showing an embodiment of a method of generating a common rule.

FIG. 3 is a view showing an embodiment of the common rule generation unit 120 of FIG. 1.

The common rule generation unit 120 generates a common rule 350 by simplifying the tree structure of the group rules 300 generated by the group rule generation unit 110. More specifically, the common rule generation unit 120 generates the common rule 350 by extracting test conditions treated as the parent nodes in the tree structure.

For example, in the tree structure of the group rules generated by the group rule generation unit 110, the test conditions treated as the parent nodes include the test conditions 25 and 121 of the acknowledgement number field and the test condition S of the flag field. Therefore, the common rule generation unit 120 generates the common rule 350 consisting of two test conditions of the acknowledgement number field and one test condition of the flag field.

Next, the intrusion detection apparatus performs the packet intrusion detection by using the common rule 350. If any test conditions of the common rule are not satisfied, the associated packet is determined to be a normal packet. If any one of the test conditions of the common rule is satisfied, it is determined that there is a need for more detailed test. That is, the packet intrusion detection is performed by using conventional rules or the aforementioned group rules 300.

Figure 4:
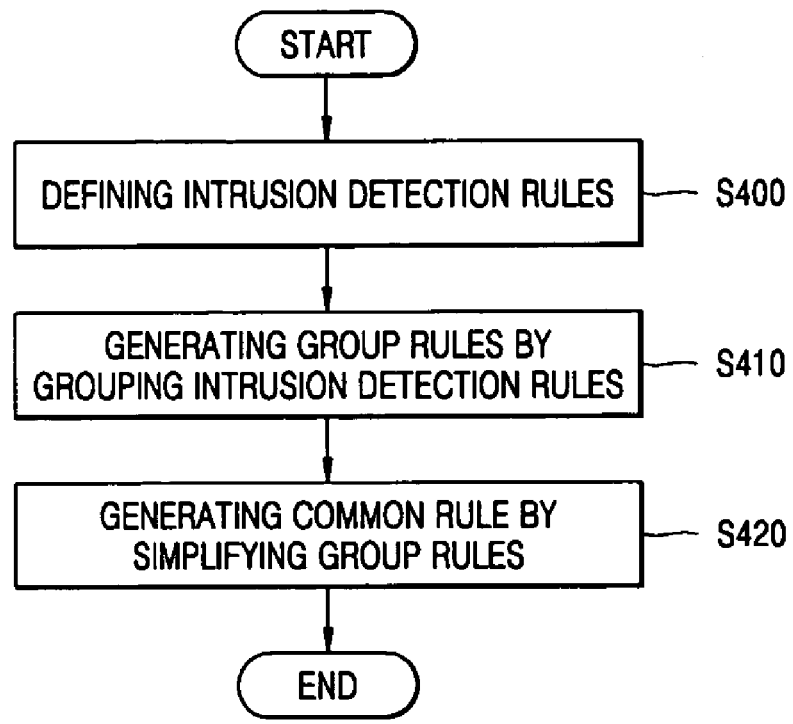
FIG. 4 is a flowchart showing a packet intrusion detection simplification method according to an embodiment of the present invention.

FIG. 4 is a flowchart showing a packet intrusion detection simplification method according to an embodiment of the present invention.

Referring to FIGS. 1 and 4, the rule definition unit 100 defines predetermined fields of a packet as test items and includes at least one intrusion detection rule (200 in FIG. 2) for defining test orders and conditions of the defined test items (S400).

A group rule generation unit 110 rearranges the intrusion detection rules (200 in FIG. 2) based on the test items 252, groups common test conditions, and connects the test conditions so that the test items and orders of the intrusion detection rules can be satisfied (S410). The group rule generation unit 110 may connect the test conditions in a tree structure. A method of generating the group rules is described-above in detail with reference to FIG. 2.

A common rule generation unit 120 generates a common rule (350 in FIG. 3) consisting of test conditions having the first test orders in a tree structure of the group rules (S420). A method of generating the common rule is described above in detail with reference to FIG. 3.

Figure 5:
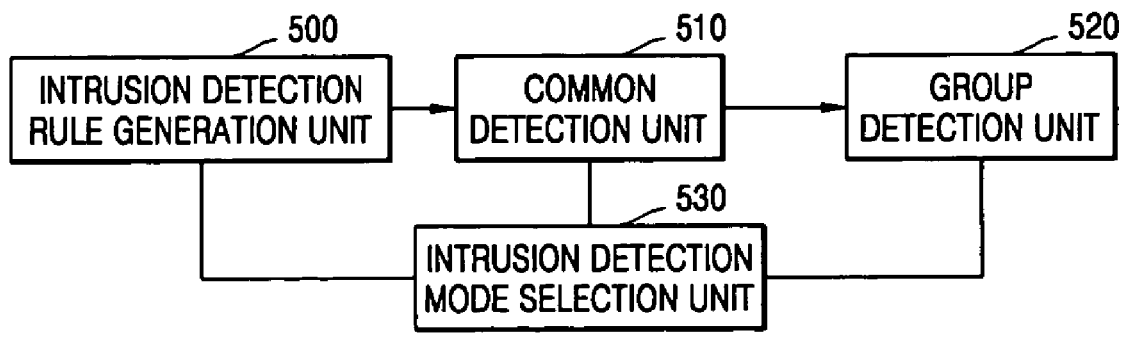
FIGS. 5 and 6 are block diagrams showing a construction of a packet intrusion detection apparatus according to an embodiment of the present invention.
Figure 6:
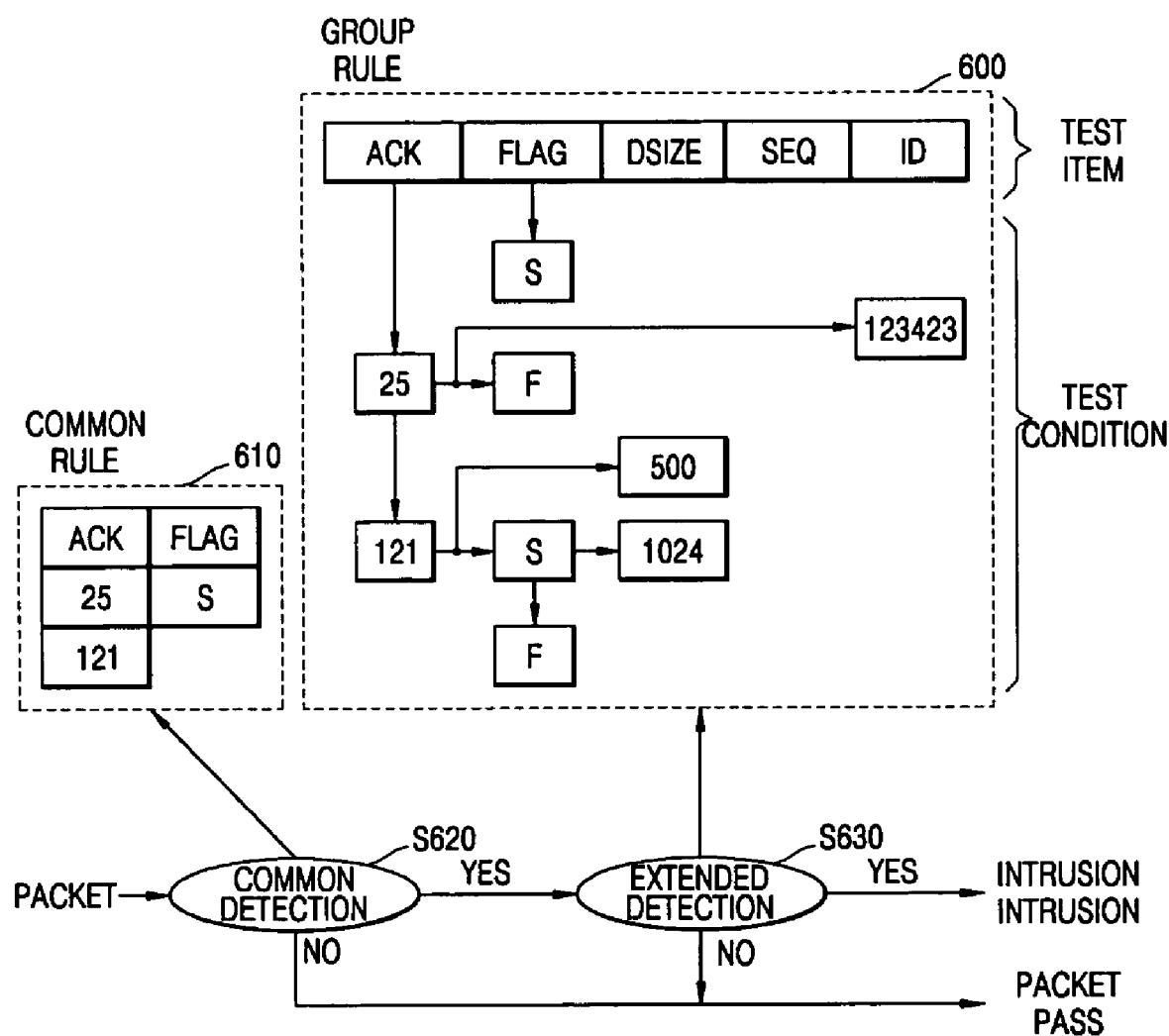

FIGS. 5 and 6 are block diagrams showing a construction of a packet intrusion detection apparatus according to an embodiment of the present invention.

The packet intrusion detection apparatus includes an intrusion detection rule generation unit 500, a common detection unit 510, a group detection unit 520, and an intrusion detection mode selection unit 530.

The intrusion detection rule generation unit 500 defines predetermined fields of a packet as test items for intrusion detection and includes intrusion detection rules for defining test orders and conditions of the defined test items. The intrusion detection rule generation unit 500 generates group rules 600 and a common rule 610 by grouping and simplifying the intrusion detection rules, respectively. Methods of generating the group rules 600 and the common rule 610 are described above in detail with reference to FIGS. 2 and 3.

The common detection unit 510 performs packet intrusion detection by using the common rule 610. For example, in a case where test conditions 25 and 121 of an acknowledgement number field and a test condition S of a flag field are included in the common rule 610, the common detection unit 510 performs the packet intrusion detection by comparing values of the acknowledgement number and flag fields with the test conditions of the common rule 610. If the value of the acknowledgement number field is not 25 and 121 and the value of the flag field is not S, the common detection unit 510 determines the packet to be a normal packet and stops the packet intrusion detection process. On the other hand, if the value of the acknowledgement number field is 25 or 121 or if the value of the flag field is S, the common detection unit 510 determines that there is a need for more detailed test and forwards the packet to the group detection unit 520.

The group detection unit 520 performs the packet intrusion detection by using the group rules 600. The group detection unit 520 uses a tree structure of the group rules which are arranged in accordance with test items based on priorities thereof. The group detection unit 520 tests packet intrusion by sequentially comparing the test conditions of parent and child nodes of the tree structure with the values of the associated fields. If test conditions of nodes from a parent node to a final child node in one path of the tree structure match with the values of the fields of the packet, the group detection unit 520 determines the associated packet to be an intrusion packet For example, in a case where values of the acknowledgement number, flag, and data size fields of a packet are 121, S, and 1024, respectively, the group detection unit 520 searches the test condition having the value of 121 matching with the value of the acknowledgement number field of the packet out of the test conditions of the acknowledgement number field of the group detection rule. Next, the group detection unit 520 searches the test condition having the value of S matching with the value of the flag field of the packet out of the test conditions of the flag field of the group detection rule, which are the child nodes of the test condition of the acknowledgement number field of the group detection rule. Finally, since the test condition of the data size fields, which is a child node of the test condition of the flag filed, has the same value as the data size field of the packet, the packet is determined to be an intrusion packet. If there is no path from a parent node to a final child node where the values of the fields of the packet match with the corresponding values at the nodes in the tree structure, the packet is determined to be a normal packet.

The intrusion detection mode selection unit 530 selects one of first to third intrusion detection modes. The first intrusion detection mode performs the packet intrusion detection by using conventional intrusion detection rules. The second intrusion detection mode (that is, a common detection mode) performs the packet intrusion detection by using the common rule according to the present invention. The third intrusion detection mode (that is, an extended detection mode) performs the packet intrusion detection by using the common rule and group rules according to the present invention. Various intrusion detection modes may be generated by combining other intrusion detection, group, and common rules, and the intrusion detection mode selection unit 530 may define and select the intrusion detection modes in administrator's consideration of network configurations.

Figure 7:
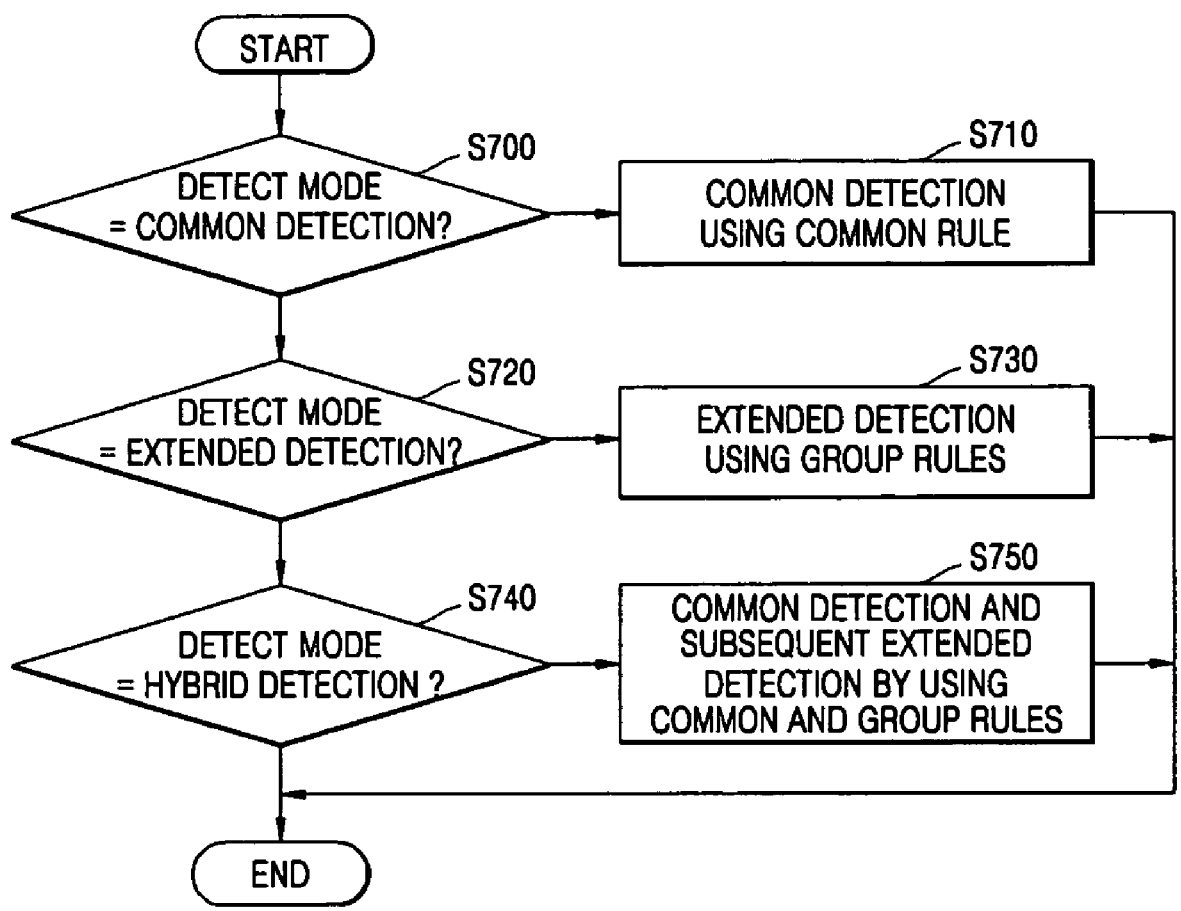
FIG. 7 is a flowchart showing a packet intrusion detection method according to an embodiment of the present invention.

FIG. 7 is a flowchart showing a packet intrusion detection method according to an embodiment of the present invention.

In general, a kernel-based packet intrusion detection method is implemented with an inner-kernel algorithm. A global variable DETECTMODE is used for the inner-kernel algorithm. The intrusion detection mode selection unit 530 defines a common detection mode using only the common detection rule, an extended detection mode using only the group detection rules, and a hybrid detection mode using all of the common and group detection rules as a DETECTMODE value. In addition, the intrusion detection mode selection unit 530 can modify the DETECTMODE value by using a proc file system in a user's application program.

Referring to FIG. 7, when a packet is incoming, the intrusion detection mode selection unit 530 checks whether or not the DETECTMODE value belongs to the common detection mode (S700). If the DETECTMODE value belongs to the common detection mode, the common detection unit 510 performs the packet intrusion detection by using the common rule (S710).

If the DETECTMODE value does not belong to the common detection mode, the intrusion detection mode selection unit 530 checks whether or not the DETECTMODE value belongs to the extended detection mode (S720). If the DETECTMODE value belongs to the extended detection mode, the group detection unit 520 performs the packet intrusion detection by using the group rules (S730).

If the DETECTMODE value does not belong to the common and group detection modes, the intrusion detection mode selection unit 530 checks whether or not the DETECTMODE value belongs to the hybrid detection mode (S740). If the DETECTMODE value belongs to the hybrid detection mode, the common detection unit 510 performs the packet intrusion detection by using the common rule and, subsequently, the group detection unit 520 performs the packet intrusion detection by using the group rules (S750).

According to the present invention, since grouped and simplified intrusion detection rules are used, it is possible to reduce a system load involved in an intrusion detection process. In addition, it is possible to effectively implement security environment by modifying intrusion detection modes in network administrator's consideration of environment situations such as network configurations and network bandwidth. Therefore, since cost and time for inner-kernel intrusion detection are reduced, a load involved in an inner-kernel intrusion process can be minimized. In addition, the intrusion detection process can be speedily and effectively performed.

In addition, since the present invention is implemented not in an application region but in a kernel region, the intrusion detection process can be optimized and system performance overhead can be minimized, so that illegal network intrusion can be powerfully prevented.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An intrusion detection rule simplification apparatus comprising:

a rule definition unit defining predetermined fields out of fields of a packet as test items and including at least one intrusion detection rule for defining test orders and conditions of the defined test items;

a group rule generation unit rearranging the test conditions of the intrusion detection rules based on the test items, grouping the same test conditions for the same test items, and generating a connection structure of the test conditions so that the test items and orders of the intrusion detection rules are satisfied; and a common rule generation unit generating a common rule consisting of test conditions having first test orders in the generated connection structure.

2. The intrusion detection rule simplification apparatus according to claim 1, wherein the rule definition unit includes intrusion detection rules for defining predetermined fields out of sequence number, acknowledgement number, identification (ID), data size, and flag fields of the packet as the test items.

3. The intrusion detection rule simplification apparatus according to claim 1, wherein, in a case where the test conditions are connected in accordance with the test items and orders of the intrusion detection rules, the group rule generation unit generates a tree structure as the connection structure by connecting test condition in the same test items to a neighbor pointer and connecting test conditions in the different test items to a child pointer.

4. The intrusion detection rule simplification apparatus according to claim 3, wherein the common rule generation unit generates the common rule consisting of test conditions existing at the highest level in the tree structure.

5. An intrusion detection rule simplification method comprising:

defining at least one intrusion detection rule by selecting predetermined fields out of fields of a packet as test items and defining test orders and conditions for the selected test items;

rearranging the test conditions of the intrusion detection rules based on the test items, grouping the same test conditions for the same test items, and generating a connection structure of the test conditions so that the test items and orders of the intrusion detection rules are satisfied; and generating a common rule consisting of test conditions having first test orders in the generated connection structure.

6. The intrusion detection rule simplification method according to claim 5, wherein the defining of the intrusion detection rules comprises defining predetermined fields out of sequence number, acknowledgement number, identification (ID), data size, and flag fields of the packet as the test items.

7. The intrusion detection rule simplification method according to claim 5, wherein, in a case where the test conditions are connected in accordance with the test items and orders of the intrusion detection rules, the generating of the connection structure comprises generating a tree structure as the connection structure by connecting test condition in the same test items to a neighbor pointer and connecting test conditions in the different test items to a child pointer.

8. The intrusion detection rule simplification method according to claim 7, wherein the generating of the common rule comprises generating the common rule consisting of test conditions existing at the highest level in the tree structure.

9. A packet intrusion detection apparatus comprising:

an intrusion detection rule generation unit rearranging test conditions of at least one intrusion detection rules based on test items, grouping the same test conditions for the same test items, generating group rules having a connection structure of the test conditions so that the test items and orders of the intrusion detection rules are satisfied, and generating a common rule consisting of test conditions existing at the test start positions in the connection structure of the group rules;

a common detection unit performing packet intrusion detection by using the common rule; and a group detection unit performing the packet intrusion detection by using the group rules.

10. The packet intrusion detection apparatus according to claim 9, further comprising an intrusion detection mode selection mode one of a first intrusion detection mode using the intrusion detection rules, a second intrusion detection mode using the common rule, and a third intrusion detection mode using the common and group rules.

11. A packet intrusion detection method comprising:

rearranging test conditions of at least one intrusion detection rules based on test items, grouping the same test conditions for the same test items, generating group rules having a connection structure of the test conditions so that the test items and orders of the intrusion detection rules are satisfied, and generating a common rule consisting of test conditions existing at the test start positions in the connection structure of the group rules;

performing packet intrusion detection by using the common rule; and performing the packet intrusion detection by using the group rules.

12. The packet intrusion detection method according to claim 11, further comprising selecting one of a first intrusion detection mode using the intrusion detection rules, a second intrusion detection mode using the common rule, and a third intrusion detection mode using the common and group rules.

* * * * *